United States Patent
Marinescu et al.

(10) Patent No.: US 7,127,582 B2
(45) Date of Patent: Oct. 24, 2006

(54) SYSTEM AND METHOD FOR KERNEL MODE MEMORY MANAGEMENT HAVING MOVEABLE KERNEL OBJECTS

(75) Inventors: Adrian Marinescu, Issaquah, WA (US); David B Probert, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/169,970

(22) Filed: Jun. 28, 2005

(65) Prior Publication Data
US 2005/0251637 A1    Nov. 10, 2005

Related U.S. Application Data

(63) Continuation of application No. 10/400,295, filed on Mar. 25, 2003, now Pat. No. 6,963,960.

(51) Int. Cl.
G06F 12/00 (2006.01)

(52) U.S. Cl. .................. 711/165; 711/170; 718/104

(58) Field of Classification Search .................. None
See application file for complete search history.

(56) References Cited

U.S. PATENT DOCUMENTS

4,229,789 A   10/1980   Morgan et al.
5,129,084 A    7/1992   Kelly, Jr. et al.

*Primary Examiner*—Nasser Moazzami
(74) *Attorney, Agent, or Firm*—Christensen O'Connor Johnson Kindness PLLC (57) ABSTRACT

The present invention is directed to improving the usage of kernel mode memory in computing environments. The invention is useful in offsetting the effects of abandonment of kernel mode memory objects. Objects in kernel mode memory space are identified and a determination is made whether all references to particular kernel objects are known by examining an object container referring to each kernel object. If all references to a kernel object are known, a determination is made whether the kernel object should be classified as a moveable object. Kernel objects classified as movable are retrievably moved to a new memory location and all references to the kernel object are updated to the new memory location. Retrievably moving kernel objects allows abandoned kernel objects to be readily detected.

17 Claims, 9 Drawing Sheets

SYSTEM AND METHOD FOR KERNEL MODE MEMORY MANAGEMENT HAVING MOVEABLE KERNEL OBJECTS

CROSS-REFERENCE TO RELATED APPLICATION

This application is a continuation of U.S. patent application Ser. No. 10/400,295, filed Mar. 25, 2003 now U.S. Pat. No. 6,963,960, the benefit of the filing date of which is hereby claimed under 35 U.S.C. § 120. This application Ser. No. 10/400,295 is expressly incorporated herein by reference.

FIELD OF THE INVENTION

The present invention generally relates to memory management in computer systems, and more specifically, to kernel mode memory management.

BACKGROUND OF THE INVENTION

In recent years, worldwide use of computers has increased dramatically. Computer application programs ("applications" or "apps") are used for a variety of purposes, including word processing, accounting, data base management, desktop publishing, communications, and the like. In addition to application programs, computing devices also have software known as an operating system that controls the operation of the computing device and the various applications and other programs that execute on the computing device. A myriad of different application programs and operating systems may be used on a computing device. Generally, operating systems provide at least two types of memory space in which to run computer programs (memory 'space', also known as virtual address space, is the amount of a type of memory that can be addressed at any instant). One type of memory space, known as "user mode" memory space, is for general applications and programs executed by a user. The other type of memory space, known as "kernel mode" memory space, is protected space that is generally available only to the core components of an operating system. To protect user applications from accessing and/or modifying critical operating system data, the operating system uses different processor access modes (user mode and kernel mode) when accessing different memory spaces. Programs running in kernel mode execute in a manner that grants greater access to system memory and processor instructions then those running in user mode. By providing the operating system software running in kernel mode with a higher privilege level than user application software, the operating system provides a way for software designers to ensure that misbehaving user applications do not disrupt the stability of the operating system as a whole.

In some circumstances, both operating system kernel mode programs (including some device drivers and other software that has been granted kernel mode access) and user applications that call kernel mode programs, after accessing objects in kernel mode, will fail to release the kernel mode objects when the objects are no longer needed. Such an omission results in excessive use of kernel memory space on behalf of the application (or kernel program) due to the continued existence of these abandoned kernel mode objects.

Abandoned objects in kernel mode memory (i.e., objects stored in kernel memory, but that will never be referenced again by applications) can considerably reduce the amount of time a computing device can reliably operate. Kernel mode memory space is a limited operating system resource. Some operating systems routinely operate near the limits of their kernel mode memory space while others do so occasionally. When programs (or processes) abandon large numbers of kernel objects without deallocating them (e.g. by not closing handles to kernel objects when finished with them), a considerable amount of kernel mode memory space becomes unavailable to the operating system. Sufficient loss can bring a halt to the operation of a computer operating system due to low kernel mode memory space availability and/or degrade the performance of a computer operating system by increasing the time the operating system requires to find free blocks of memory and/or contributing to the fragmentation of memory resulting in inefficient usage. In the past, degradation due to kernel object abandonment has been resolved by terminating any program that has abandoned kernel objects or restarting the computing system if the program causing the problem cannot be identified or is a kernel mode program. Clearly, it would be desirable to have a kernel object management system that does not require restarting programs and/or computing systems to alleviate kernel object abandonment. The present invention is directed to providing such a management system for kernel mode objects.

One way of managing and detecting kernel object abandonment is to monitor the resources used by processes (often associated with user mode resource identifiers, such as handles) and identify processes that are using excessive numbers of kernel objects. However this does not provide enough information to determine whether the kernel objects are actually used or not since applications vary widely in their use of kernel mode objects; also it does not provide the information regarding which kernel mode objects may have been abandoned. For example a server process might show a rapid increase in handles as a response to an increase in number of connections.

Abandonment of kernel mode objects causes the same types of performance and reliability problems as memory leaks. While the problems posed by memory leaks, including those of kernel mode memory leaks, are generally known, solutions have heretofore not addressed abandoned kernel objects (objects in kernel mode memory which appear to have been abandoned by their origins but which cannot be reliably determined to have been in fact abandoned). Therefore, a need exists for a method of managing, identifying, and resolving abandoned kernel mode objects in a way that improves the stability and performance of operating systems. Additionally, a need exists for a memory management method that also defragments the kernel memory by reorganizing kernel mode objects.

Another difficulty posed by previous systems has been the problem of identifying the programs or processes that abandon kernel objects. Accordingly, there is a further need for a method of identifying the origins of abandoned kernel objects.

SUMMARY OF THE INVENTION

The present invention is directed to improving the usage of kernel mode memory space in computing environments. The invention can be used to offset the effects of abandonment of kernel mode memory objects. In one exemplary embodiment of the invention, objects in kernel mode memory space are identified and a determination is made whether all references to particular kernel objects are known by examining an object container referring to each kernel object. If all references to a kernel object are known, a determination is made whether the kernel object should be classified as a moveable object. Kernel objects that have been classified as movable are selectively retrieved and moved to a new memory location (kernel mode or user mode) or to a non-memory persistent store. All references to retrieved and moved kernel object are updated to the new memory location or to a small descriptor that points to the persistent store.

Classifying and moving kernel objects makes it possible to both defragment kernel mode memory and alleviate resource depletion caused by abandoned kernel objects.

In accordance with other aspects of this invention, determining that all references to a kernel object are known involves obtaining a count of references that refer to the kernel object and determining that all references to the kernel object come from a particular object container, such as a procedure handle table. The references may be pointers, handles and/or file descriptors and the like, to the kernel object.

In accordance with further aspects of this invention, determining how to classify an object involves determining if a kernel object has been accessed within a short-term threshold access time and if the kernel object was created within a creation threshold time. If so the kernel object is classified as a moveable object that can be moved to an open kernel memory location.

In accordance with an alternate aspect of this invention, a kernel object may be classified as movable if it has not been accessed within the short-term threshold time. Such objects are classified as inactive and movable to a low access time memory location.

In accordance with still another aspect, if a kernel object has not been accessed within a long-term threshold time, it is classified as probably an abandoned object and moveable to a storage space location.

Moving kernel objects according to their classification preserves kernel mode memory resources, provides defragmented kernel memory and better locality to commonly accessed kernel objects.

In accordance with exemplary aspects of the present invention, movement of a kernel object to a new memory location causes data within the kernel object that is affected by the changed memory location to be updated. Still further, moving a kernel object to a new memory location frees the prior kernel object memory location. Freeing a kernel object memory location releases the memory occupied by the kernel object without dereferencing the kernel object.

In accordance with a further aspect of the present invention, kernel mode memory is managed by classifying kernel objects according to their usage and relocating kernel objects to new locations in accordance with the classification of the kernel objects. That is, destination memory locations for kernel objects is determined according to a kernel object's usage classification. After a destination memory location has been determined for a kernel object, a specific object type move procedure is invoked to relocate the kernel object to a new memory location. The move procedure, which runs in a context where more detailed information of the object is available and understood, also has the option to reject a move. In particular when specific objects may have unregistered references. If the move procedure accepts the move and successfully updates all specific information, the old memory location is freed.

In accordance with still further aspects of the present invention, abandoned kernel objects are detected by monitoring kernel memory to identify kernel objects that have a last access time beyond a predetermined threshold. Identified kernel objects are relocated to a new memory location and examined to determine the origin of the kernel object. After the origin of the kernel object has been found, the origin is identified as a probable source of abandoned kernel objects. The identified origins of probable sources of abandoned kernel objects can be used by debugging software or developers to correct programs that are causing the abandoning of kernel objects.

As will be readily appreciated from the foregoing summary, the invention provides a new and improved method, system and computer-readable medium for providing kernel mode object management and abandoned object detection.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
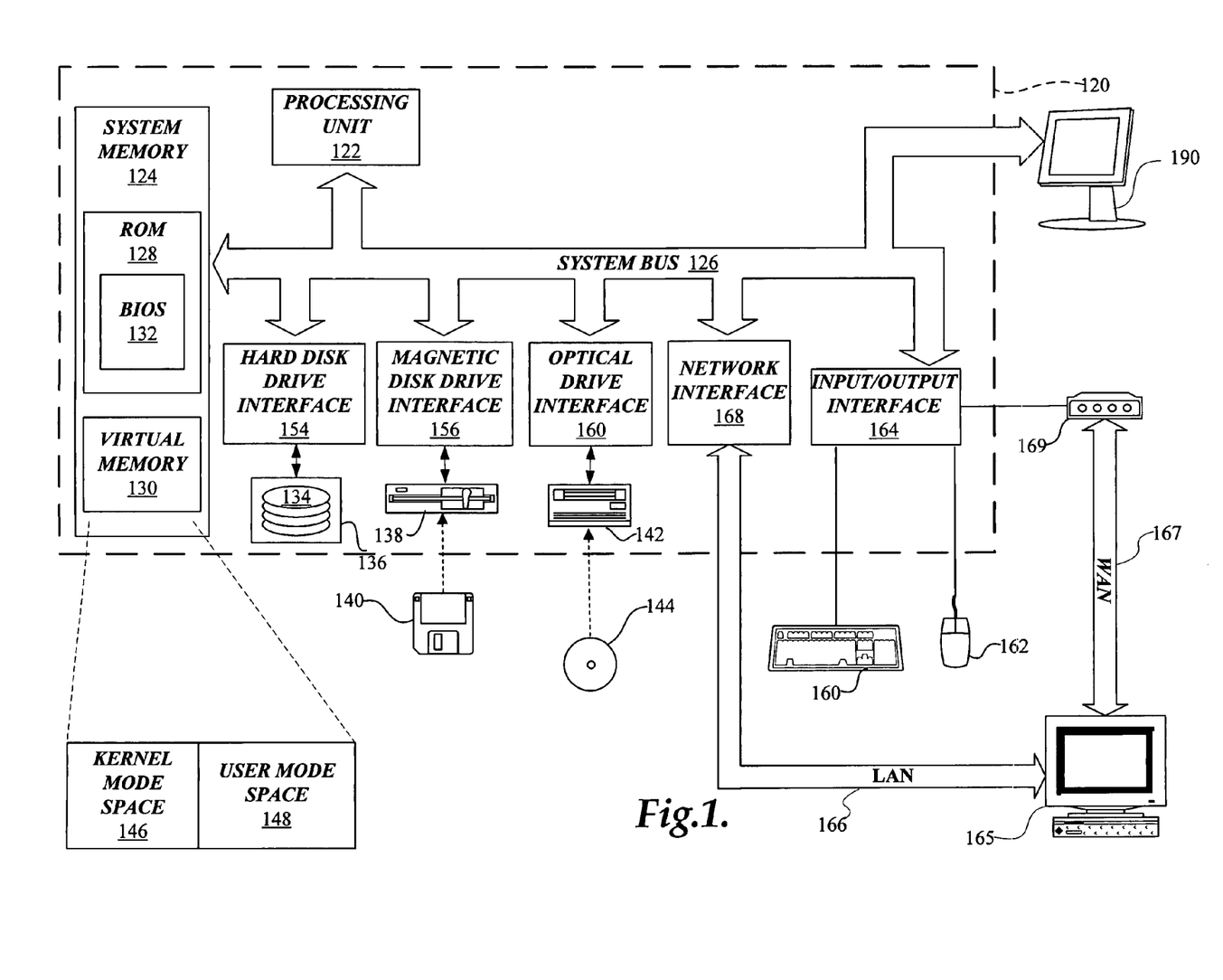
FIG. 1 is an exemplary block diagram of a computing device having both kernel and user mode memory.

The detailed description which follows is represented largely in terms of processes and symbolic representations of operations by conventional computer components, including a processor, memory storage devices for the processor, connected display devices, and input devices. It is to be understood that the described processes and operations may utilize conventional computer components in a heterogeneous distributed computing environment, including remote file servers, computer servers, and memory storage devices. Each of these conventional distributed computing components is accessible by the processor via a communications network. FIG. 1 illustrates an example of a suitable computing system environment in which the invention may be implemented. The computing system environment shown in FIG. 1 is only one example of a suitable computing environment and is not intended to suggest any limitation as to the scope of use or functionality of the invention. Neither should the computing environment be interpreted as having any dependency requirement relating to any one or a combination of components illustrated in the exemplary operating environment.

The invention is operational in numerous general purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, mini-computers, mainframe computers, and distributed computing environments that include any of the above systems, or the like.

The invention is described in the general context of computer-executable instructions, such as program modules, being executed by a computer. Generally, program modules include routines, programs, objects, components, data structures, etc., that perform a particular task or implement particular abstract data types. In addition to stand alone computing systems, the invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computing device 120. Components of the computing device 120 include, but are not limited to, a processing unit 122, a system memory 124, one or more displays 190, and a system bus 126 that couples various system components including the system memory 124 to the processor 122. The system bus 125 may be any of several types of bus structures including a memory bus or memory controller, peripheral bus, or a local bus using any of a variety of bus architectures. By way of example, and not limitation, such architectures include industry standard architecture ("ISA") bus, microchannel architecture ("MCA") bus, enhanced ISA ("EISA") bus, video electronic standards association ("VESA") local bus, peripheral component interconnect ("PCI") bus, also known as mezzanine bus, and accelerated graphics port ("AGP") bus.

The computing device 120 typically includes a variety of computer-readable media. Computer-readable media can be any available media that can be accessed by the computing device 120 and include both volatile and non-volatile media, and removable and non-removable media.

By way of example, and not limitation, computer-readable media may comprise computer storage media and communication media. Computer storage media includes, but is not limited to, random access memory ("RAM"), ROM, EEPROM, flash memory or other memory technology, CD-ROM, digital versatile disc ("DVD") or other optical storage, magnetic cassettes, magnetic tape, magnetic disk storage or other magnetic storage devices, or any other medium which can be used to store or communicate the desired information and which can be accessed by the computing device 120.

The communication media typically embodies computer-readable instructions, data structures, program modules, or other data in a modulated data signal, such as a carrier wave or other typical transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct wired connection, and wireless media, such as acoustic, radio frequency, infrared, and other wireless media. Combinations of any of the above should also be included within the scope of computer-readable media.

The system memory 124 includes computer storage media in the form of volatile and non-volatile memory, such as read only memory ("ROM") 128 and virtual memory 130. A basic input/output system 132 ("BIOS") containing basic routines that help to transfer information between elements within the computing device 120, such as during startup, is typically stored in ROM 128. Virtual memory 130 typically contains data and/or program modules that are immediately accessible to, and/or presently being operated on, by the processing unit 122. By way of example, and not limitation, FIG. 1 illustrates that virtual memory 130 includes kernel mode space 146 and user mode space 148 as memory spaces suitable for containing operating system, application programs and other program modules, and program data.

The computing device 120 may also include removable/non-removable, volatile/non-volatile computer storage media. By way of example only, FIG. 1 illustrates a hard disk drive 134 that reads from or writes to non-removable, non-volatile magnetic media 136, a magnetic drive 138 that reads from or writes to a removable, non-volatile magnetic disk 140, and an optical drive 142 that reads from or writes to a removable, non-volatile optical disc 144, such as a CD-ROM or other optical media. Other removable/non-removable, volatile/non-volatile computer storage media that can be used in the exemplary operating environment include, but are not limited to, magnetic tape cassettes, flash memory cards, DVDs, digital video tapes, Bernoulli cap cartridges, solid state RAM, solid state ROM, and the like. The hard disk drive 134, magnetic disk drive 138, and optical disc drive 142 may be connected to the system bus 126 by a hard disk drive interface 154, a magnetic disk drive interface 156, and an optical drive interface 158, respectively. Alternatively, hard disk drive 134, magnetic disk drive 138, and optical disc drive 142 may be connected to the system bus 126 by a small computer system interface ("SCSI").

The drives and their associated computer storage media discussed above and illustrated in FIG. 1, provide storage of computer-readable instructions, data structures, program modules, and other data from the computing device 120. In FIG. 1, for example, the hard disk drive 134 may also store an operating system, application programs, other programs and program data. Note that these components can either be the same as or different from the operating system, the other program modules, and the program data stored in virtual memory 130. A user may enter commands and information into the computing device 120 through an input device, such as keyboard 160 and/or a pointing device 162, commonly referred to as a mouse, trackball, or touch pad. Other input devices (not shown) may include a microphone, a joystick, a game pad, a satellite dish, a scanner, or the like. These and other input devices are often connected to the system bus 126 through user input interface 164 and may be connected by other interface and bus structures, such as a parallel port, serial port, game port, universal serial bus ("USB"), or other interface.

The computing device 120 may operate in a network environment using logical connections to one or more remote computers 165. The remote computer 165 may be a personal computer, a server, a router, a network PC, a peer device, or other common network node and typically includes many or all the elements described above relative to the computing device 120. The logical connections depicted in FIG. 1 include a local area network ("LAN") 166 and a wide area network ("WAN") 167, but may also include other networks. Such network environments are commonplace in offices, enterprise-wide computer networks, intranets, and the Internet.

When used in a LAN network environment, the computing device 120 is connected to the LAN 166 through a network interface 168. When using a WAN network environment, the computer typically includes a modem or other means for establishing communication over the WAN, including a network interface 168, over the WAN 167, such as the Internet. The modem 169, which may be internal or external, may be connected to the system bus 126 via the user input interface 164 or other appropriate mechanism. It will be appreciated that the network connections shown are exemplary and that other means of establishing communications between computers may be used. Although many other internal components of the computing device 120 are not shown, those of ordinary skill in the art will appreciate that such components and their interconnections are well known. Accordingly, additional details concerning the internal construction of the computing device 120 need not be disclosed in connection with the present invention.

Those skilled in the art will understand that program modules, such as the operating system, the application programs, and the program data are provided to the computing device 120 via one of its memory storage devices, which may include ROM 128, virtual memory 130, hard disk 134, magnetic disk drive 138, or optical disc drive 142. The hard disk drive 134 is used to store program data and programs, including the operating system and application programs.

When the computing device 120 is turned on or reset, the BIOS 132, which is stored in ROM, instructs the processing unit 122 to load the operating system from the hard disk drive 134 into the virtual memory 130. Once the operating system is loaded into virtual memory 130, the processing unit 122 executes the operating system code and causes the visual elements associated with the user interface of the operating system to be displayed on a monitor. When a program is opened by a user, the program code and relevant data are read from the hard disk drive 134 and stored in virtual memory 130.

Figure 2:
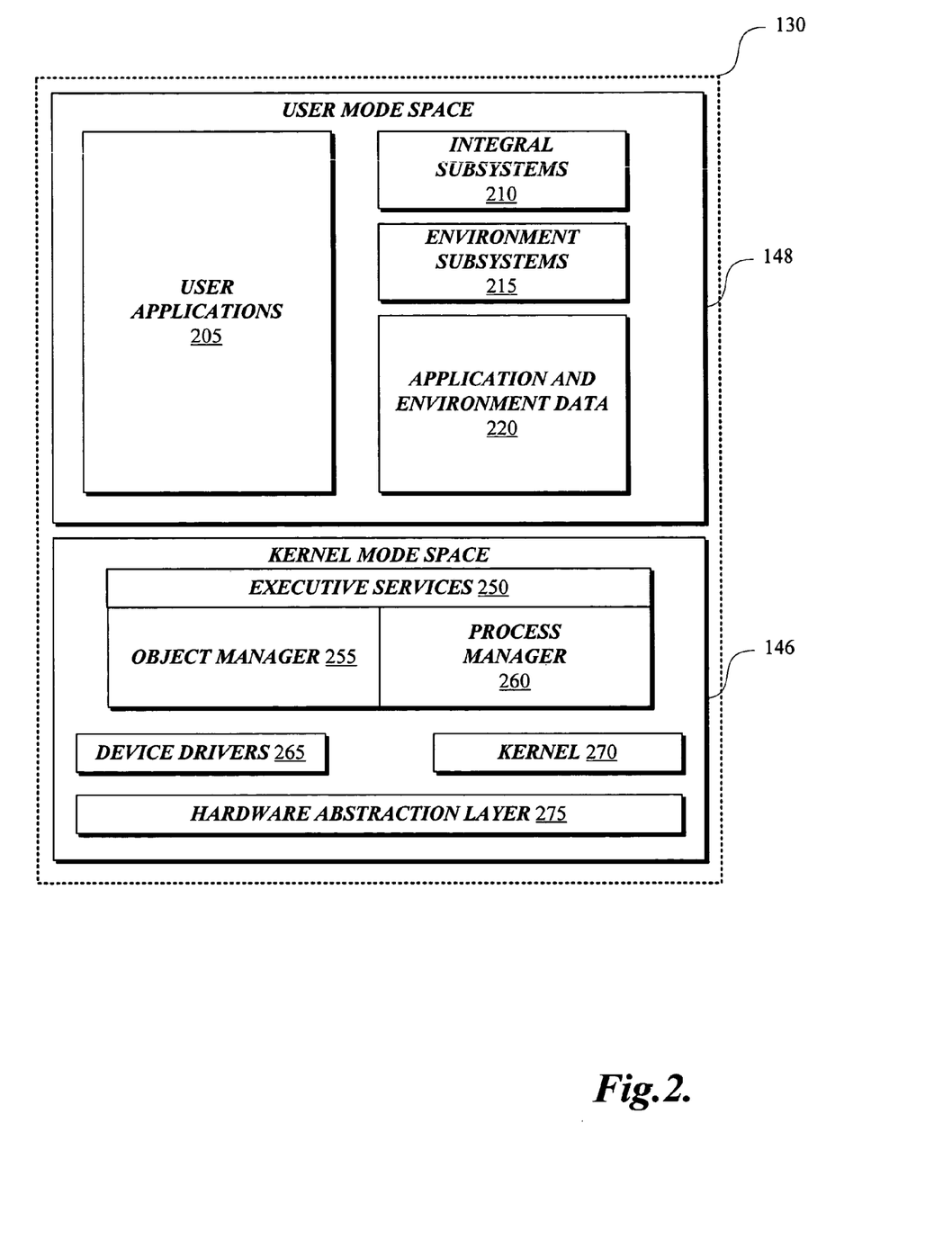
FIG. 2 is a pictorial diagram showing computer memory organized into user and kernel mode memory areas.

FIG. 2 illustrates in more detail a simplified memory architecture for the virtual memory 130 of a computing device 120 of the type shown in FIG. 1. As noted above, the virtual memory 130 is divided into user mode space 148 and kernel mode space 146. The user mode space 148 contains code and data for a number of programs, including, but not limited to, user applications 205, integral subsystems 210, environment subsystems 215, and application environment data 220. User applications 205 have been generally described above. User applications include any programs that are initiated by users that do not fall into the other categories of user mode programs described below. Integral subsystems 210 include processes that support the operating system, such as log-in processes and a session manager that operate outside the kernel mode to interact with a user. Environment subsystems 215 expose the native operating system services to user applications through callable functions, thereby providing an operating system "environment" with which user applications can interact. Applications and environment data 220 are the portions of memory that are used to store values associated with programs running in user mode 148.

The kernel mode space 146 also contains code and data for a number of programs including, but not limited to, executive services 250, device drivers 265, a kernel 270 and a hardware abstraction layer 275. The executive services contain the base operating system services such as memory management, process and thread management (e.g., via the process manager 260), object management (e.g., via the object manager 255), security, input/output ("I/O") and interprocess communications. The device drivers include both hardware device drivers that translate user I/O function calls into specific hardware device I/O request as well as file system and network drivers. The kernel 270 comprises low-level operating system functions, such as thread scheduling, interrupt and exception dispatching and multiprocessor synchronization. It also provides a set of routines and basic objects that the executive services 250 use to implement higher level constructs.

While an exemplary set of operating system and other programs have been shown in FIG. 2 and described above, those of ordinary skill in the art and others will appreciate that more or less programs may be present in a computing system memory. Still further, those of ordinary skill in the art and others will appreciate that the responsibilities and actions of the described programs may vary depending on the operating system and/or computing device upon which the operating system resides. For example, depending on the operating system (or a particular configuration of an operating system), resource allocation decisions may be made differently at system boot time, such as the size and number of operating system heaps, the number of internal system worker threads, and the size of the system data cash. Also, run time policy decisions, such as the way a money manager trades off system and process memory demands, may differ between various operating systems.

Figure 3:
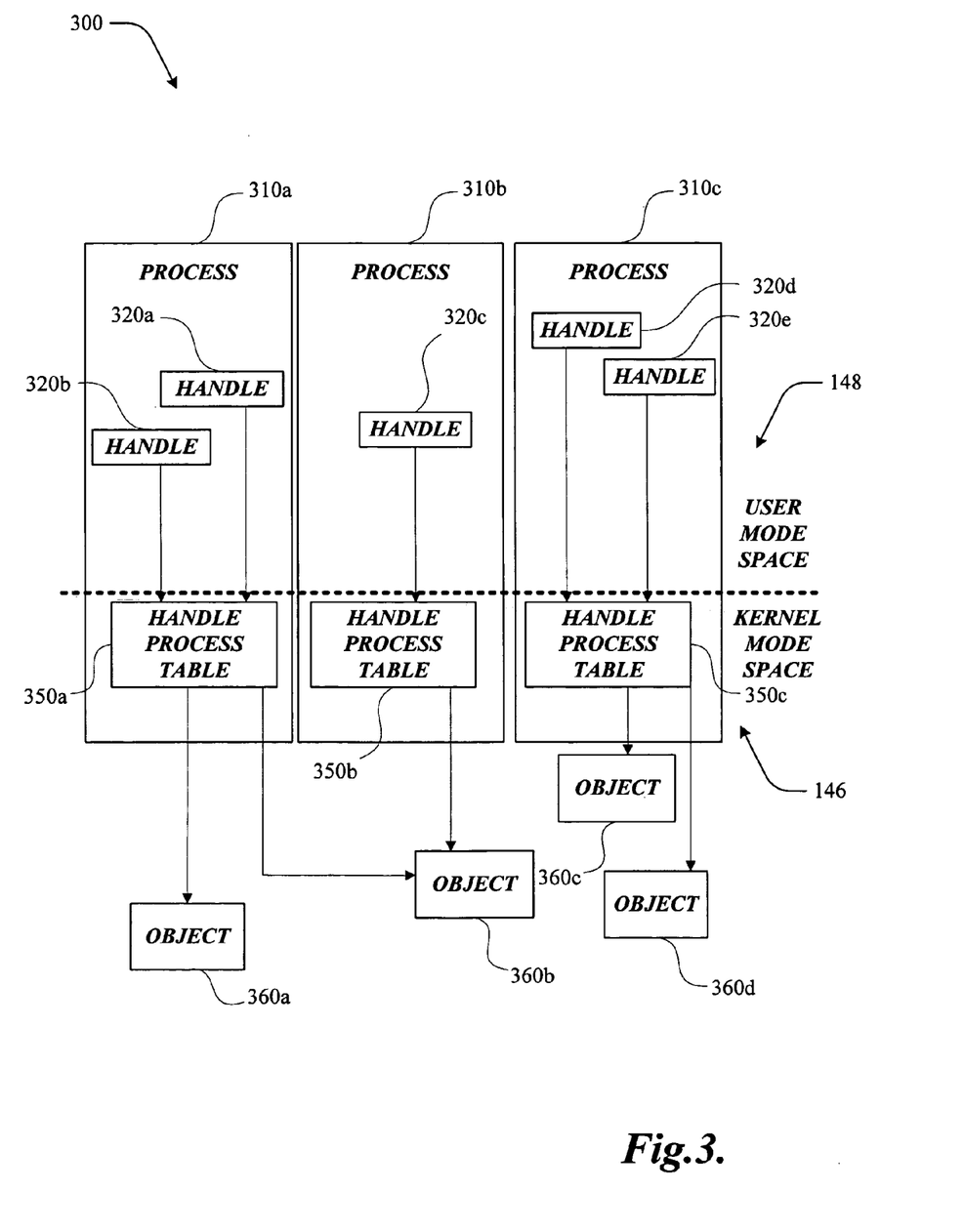
FIG. 3 is a pictorial diagram of kernel and user mode memory components.

FIG. 3 illustrates an exemplary memory environment 300 employed by an exemplary operating system currently executing a number of processes 310a, 310b, 310c .... Each process 310a, 310b, 310c ... includes at least one handle 320a, 320b ... associated with a kernel object 360a, 360b, 360c .... Each handle 320a, 320b, 320c ... points to a handle table 350a, 350b, 350c ... included in each process 310a, 310b, 310c ... that redirects the associated handle to the related kernel object 360a, 360b, 360c .... The memory space 300 is included to illustrate the relationship between processes 310, handles 320, handle process tables 350, and kernel objects 360 and should be taken as exemplary, not limiting. Note that the processes 310a, 310b, 310c ... conceptually extend through both the user mode space 148 and kernel mode space 146 of the memory space 300, the handles being located in the user mode space 148 and the handle process tables and the objects being located in the kernel mode space 146. Maintaining the handle process tables 350a, 350b, 350c ... in the kernel mode 146 and allowing the handles 320a, 320b, 320c ... to point to the handle process tables 350a, 350b, 350c ... allows the handles to indirectly reference the kernel objects 360. Those of ordinary skill in the art and others will appreciate that the memory space 300 illustrated in FIG. 3 is merely an exemplary representation and is not meant to limit the scope of the current invention. There may be more or less processes 310a, 310b, 310c ... with more or less handles 320a, 320b, 320c ... and kernel objects 360a, 360b, 360c ... than those illustrated in FIG. 3 in an actual embodiment of the invention.

Figure 4:
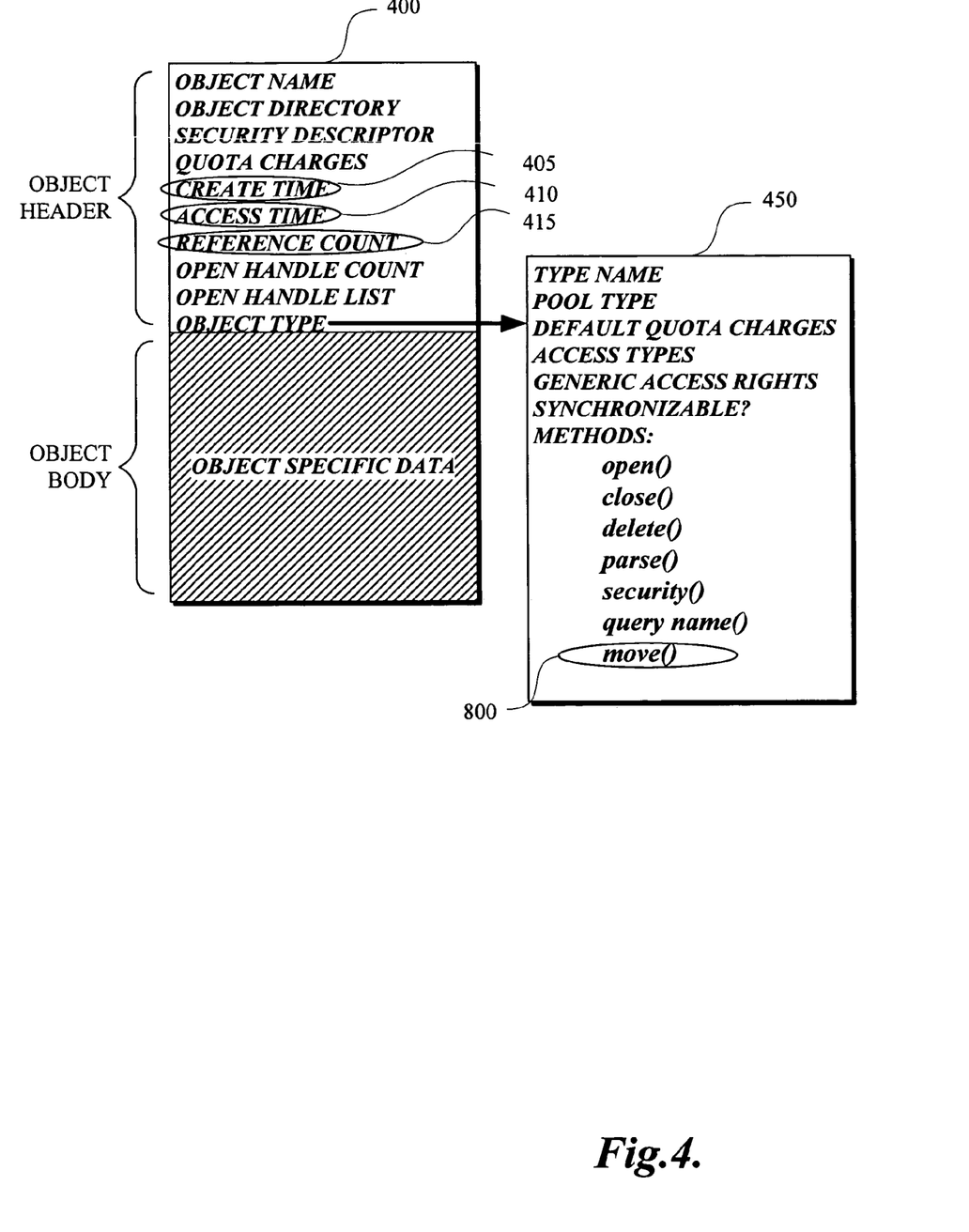
FIG. 4 is a block diagram of a kernel object memory component.

The kernel objects 360a, 360b, 360c ... will be better understood by a further explanation of certain characteristics of kernel objects illustrated in FIG. 4. More specifically, FIG. 4 illustrates an exemplary object data structure 400. Object data structures contain information that defines an object. As shown in FIG. 4, such information may include, but is not limited to, an object's name, a parent directory, location, security characteristics, quota information, current handle count, current handle list, object type, reference count, etc. fields. The illustrated exemplary object data structure 400 also includes a create time field 405 and access time field 410 that may not be present in all conventional types of kernel object data structures. As will be better understood from the following description, the create time field 405 and the access time field 410 are employed by the presently preferred embodiment of the invention. As will be understood from the following description of the preferred embodiment, the present invention also makes use of the reference count field 415 (count of pointers, including handles, referring to the object) as well as an optional object type specific move routine 800 present in an object type object 450 referenced by the object data structure 400. Object type objects 450 contain information describing the type of object that references the object type object 450. Information about the type of object includes, but is not limited to, the type name, pool type, default quota charges, access types, generic access rights, whether the object is synchronizible, and a number of methods available to the type of objects. Such methods may include, but are not limited to, open, close, delete, parse, security, and query name methods and, in the present invention, a move method 800. The move method corresponds to an object type specific move group subroutine illustrated in FIG. 8 and described below.

Figure 5:
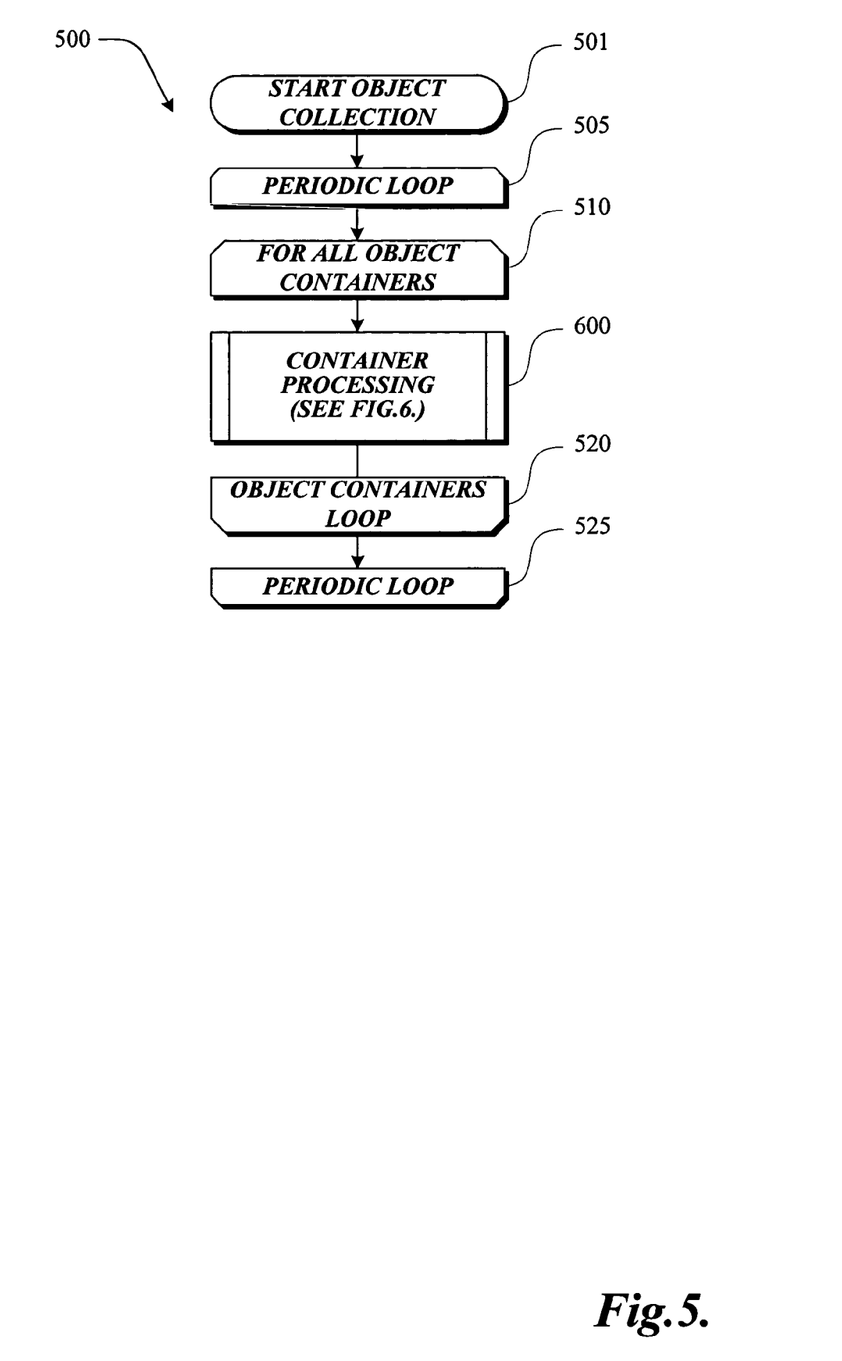
FIG. 5 is a flow diagram illustrating an object collection routine implemented by a computing device to manage kernel objects formed in accordance with the present invention.

Using the exemplary operating environments, the operation of an embodiment of the present invention will be next described in relation to these environments. As illustrated in FIGS. 1 and 2, computing devices 120 implementing the present invention include a virtual memory 130. A flow chart illustrating an exemplary object collection routine 500 implemented by such a computing device 120 is shown in FIG. 5.

The object collection routine 500 begins at block 501 and proceeds to looping block 505, which periodically repeats. The period in which looping block 505 repeats is determined by the needs of a particular computing device 120 and its operating system. In some environments, such as a development environment or a system testing environment, it may be desirable to set relatively short periods so as to provide more frequent testing. In a general processing environment, a balance must be struck between the amount of processing required to collect and categorize objects in accordance with the present invention (described below), and the benefits that such collection and categorization can provide. Processing routine 500 proceeds next to an object container looping block 510, which iterates through all kernel object containers. Kernel object containers may include process handle tables, object type lists, and the object manager's namespace. Next, processing proceeds to a kernel object container processing subroutine 600, illustrated in FIG. 6 and described below, which processes each kernel object container to classify and/or move kernel objects in accordance with the present invention. After each pass through the kernel object container processing subroutine 600, as shown by block 520, the object container loop returns to block 510, until all of the kernel object containers have been iterated through. After all the kernel object containers have been iterated through, processing proceeds to block 525, and loops back to block 505.

Figure 6:
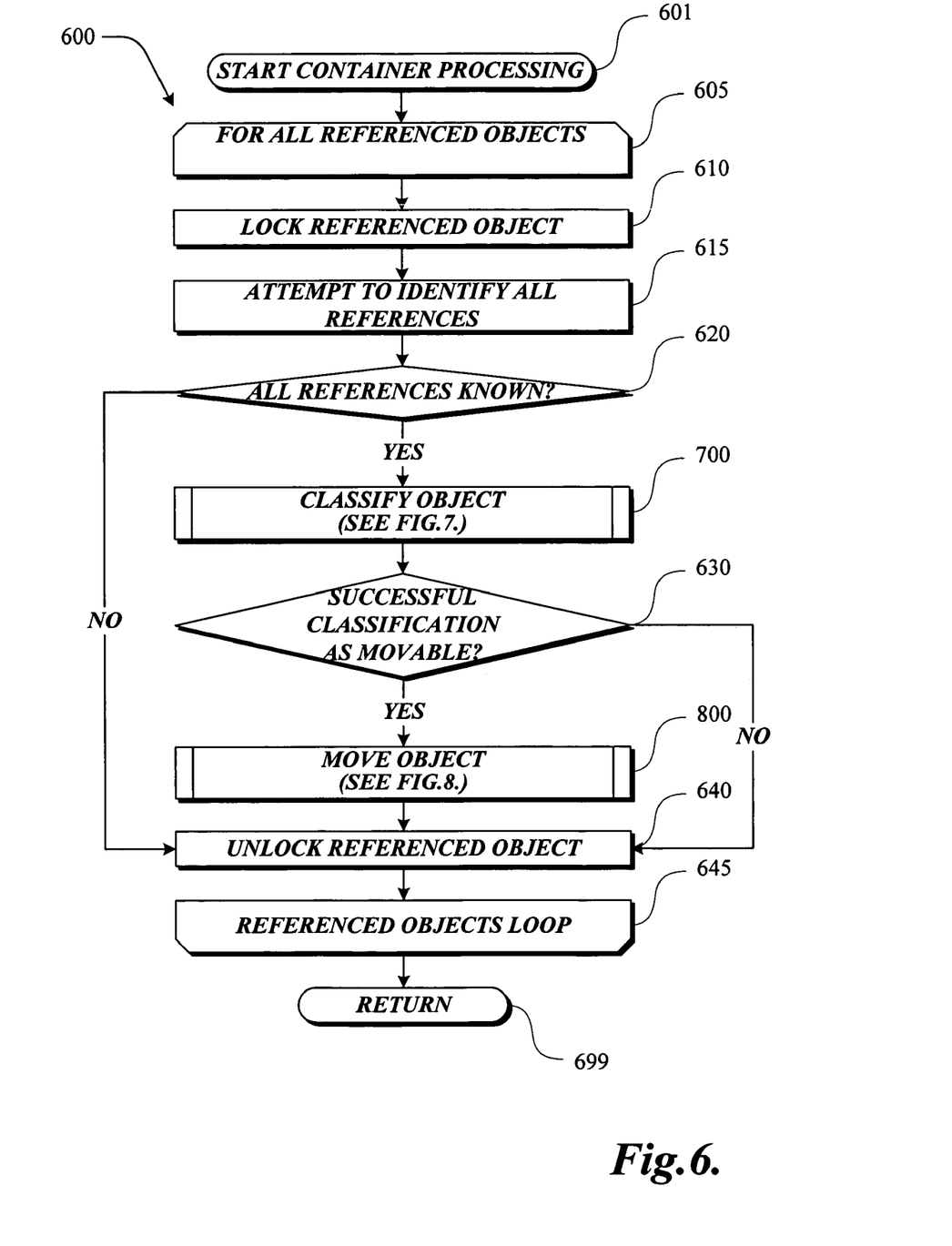
FIG. 6 is a flow diagram illustrating a container processing subroutine suitable for use in FIG. 5.

As noted above, the object collection routine 500 includes a kernel object container processing subroutine 600. The kernel object container processing routine sorts through kernel objects to determine which kernel objects should be further examined as potential abandoned objects. FIG. 6 is an exemplary illustration of a suitable container processing subroutine 600. Subroutine 600 begins at block 601 and proceeds to looping block 605, which iterates through all objects present in a container. Next, in block 610, the current object referenced by the container is locked so that it cannot be removed from container and deleted while doing the processing. There is no requirement for a generic locking mechanism for objects; the locking is done in respect with the container (e.g. locking the handle's access to the object if the container is a process handle table, locking the parent directory if the container is a directory object). Next, in block 615, an attempt is made to identify all references to the locked object. Then a test is made to determine if all references to the locked object are known. See block 620. If in decision block 620 it was found that all references are known (e.g., if all references to the object are from a current container, such as, if the container has one reference to the object and the object has a reference count value 415 of one, or if the reference count matches the number of handles opened to the object, or if the object is named and it has two references—one must be from handle and the second from the parent directory), then processing continues to object classification subroutine 700. If, however, in decision block 620 it was determined that not all the references were known, the object is not classified and processing continues to block 640 where the currently object's access is unlocked.

Those of ordinary skill in the art and others will appreciate that a variety of object referencing schemes may be used without departing from the spirit and scope of the present invention. In particular, other referencing schemes may allow a predetermined number of references to an object to be known. For example, in an alternate referencing scheme all named kernel objects have at least three references. Therefore, if a named kernel object has a reference count of three, then the objects references are all known and it would also be eligible for classification.

As already noted, if all the references are known, the object may be classified as in exemplary object classification subroutine 700 illustrated in FIG. 7 and described below. After the object classification subroutine 700 returns, then in decision block 630 a determination is made whether the subroutine 700 returned a classification of the object as a moveable object. If so, processing continues to the move object subroutine 800 illustrated in FIG. 8 and described below. After an object has been classified as moveable and moved in accordance with move object subroutine 800, then in block 640 the container unlocks the access path to the object, which now represents a new location. If, however, in decision block 630 it was determined that the object was not successfully classified as moveable, processing continues to block 640 where the container unlocks the currently referenced object without moving the object. After unlocking, processing proceeds to looping block 645 and cycles back to looping block 605 unless all referenced objects of the current container have been iterated through. If all referenced objects of the current container have been iterated through, processing proceeds to block 699 which returns to subroutine 600's calling routine.

As noted above, the container processing subroutine 600 utilizes an object classification subroutine 700. An exemplary object classification subroutine is illustrated in FIG. 7. As describe more fully below, the object classification subroutine 700 classifies the kernel objects by type, including whether they are moveable or nonmovable kernel objects. Movable objects are those that, as determined by the present invention, have characteristics that allow the objects to be desirably moved from one memory location to another memory location to enhance memory usage or performance. Nonmovable objects are those that are determined to have characteristics that make it undesirable to move the objects at the point in time the objects are classified. The same object may be classified differently as moveable or nonmovable at different times depending on its recent usage (e.g., whether the object has been recently accessed).

The object classification subroutine 700 begins at block 701 and proceeds to block 705 where the last access time for the current object is obtained. As noted above and shown in FIG. 4, in at least one exemplary embodiment of the present invention, the data structure of kernel mode objects includes an access time field 410. Although we use the term of "time field," those of ordinary skill in the art and other will appreciate that this field may take the form of a simple sequence number with a low number of bits, in order to reduce the size of the object header, and increase the performance. Next, in decision block 710, a determination is made whether the time elapsed since the value of the access time field 410 is less than a short-term threshold value. This threshold value may vary depending on the operating system, computing device 120, memory availability, and other factors. Exemplary non-limiting arbitrary short-term threshold values lie in the range of five hundred to one thousand five hundred seconds. Those of ordinary skill in the art and others will appreciate that the short-term threshold value is a length of time sufficient to classify an object as being inactive due to a lack of access.

If in decision block 710 it is determined that the time since the current object was accessed is less than the short-term threshold, then in block 715 the creation time of the current object is determined. Again, as noted above with regard to FIG. 4, an exemplary kernel mode object data structure 400 includes a create time field 405 indicating the creation time of an object. The creation time may also take the form of a sequential number. Next, in decision block 720, a determination is made whether the time since object creation is above a creation threshold value. Exemplary non-limiting arbitrary creation threshold values lie in the range of one thousand five hundred to two thousand five hundred seconds. If the time since creation is above a creation threshold value, in block 725 the object is classified as: "ongoing (moveable)." As will be appreciated by those of ordinary skill in the art and others from the foregoing description, an ongoing (moveable) object is an object that does not have a recent create time but that has been used recently, thereby indicating that while the object has been in use for a period of time, the object continues to be used. Those of ordinary skill and the art and other will appreciate that moving such classes of objects mostly helps reduce kernel memory fragmentation. Accordingly, subroutine may also take in account memory counters, and decide not to move the object, if no or a low memory fragmentation is experienced.

If in decision block 720 it was determined that the creation time of the object was not above the creation threshold, then in block 730 the object is classified as "active (not moveable)". Those of ordinary skill in the art and others will appreciate from the foregoing description active (not moveable) objects were recently created objects and have been recently accessed. Because such objects were only recently created, as those of ordinary skill in the art and others will appreciate, moving such objects may not achieve any performance benefits. For this reason, recently created and recently accessed objects are classified as not movable objects.

If in decision block 710 it was determined that the time since the last access to the current object was greater than the short-term threshold, processing proceeds to decision block 735 where a determination is made whether the time since the object was last accessed is less than a long-term threshold. Exemplary non-limiting arbitrary long-term threshold values, lie in the range of one to five hours. If the time since the last access is less than the long-term threshold, the object is classified as "inactive (moveable)." Those of ordinary skill in the art will appreciate that it may be desirable to maintain some kernel objects in memory for extended periods of time even through they are not accessed. Such objects, which fall within an intermediate period of time, are classified as inactive (moveable) because there may be benefits to keeping them in memory while moving them to a more desirable, but less obstructive, memory location, along with other objects in the same class.

If in decision block 735 it was determined that the time since the last access was not less than a long-term threshold, processing proceeds to block 745 where the object is classified as "abandoned (moveable)." Those of ordinary skill in the art and others will appreciate that objects that have not been accessed for an extended period of time are probably abandoned objects and that there is little or no benefit in maintaining abandoned objects in memory. Accordingly, in block 745 such objects are classified as abandoned (moveable). After the current object has been classified by following one of the paths of subroutine 700 shown in FIG. 7, processing proceeds to block 799 and returns to the calling routine.

Figure 8:
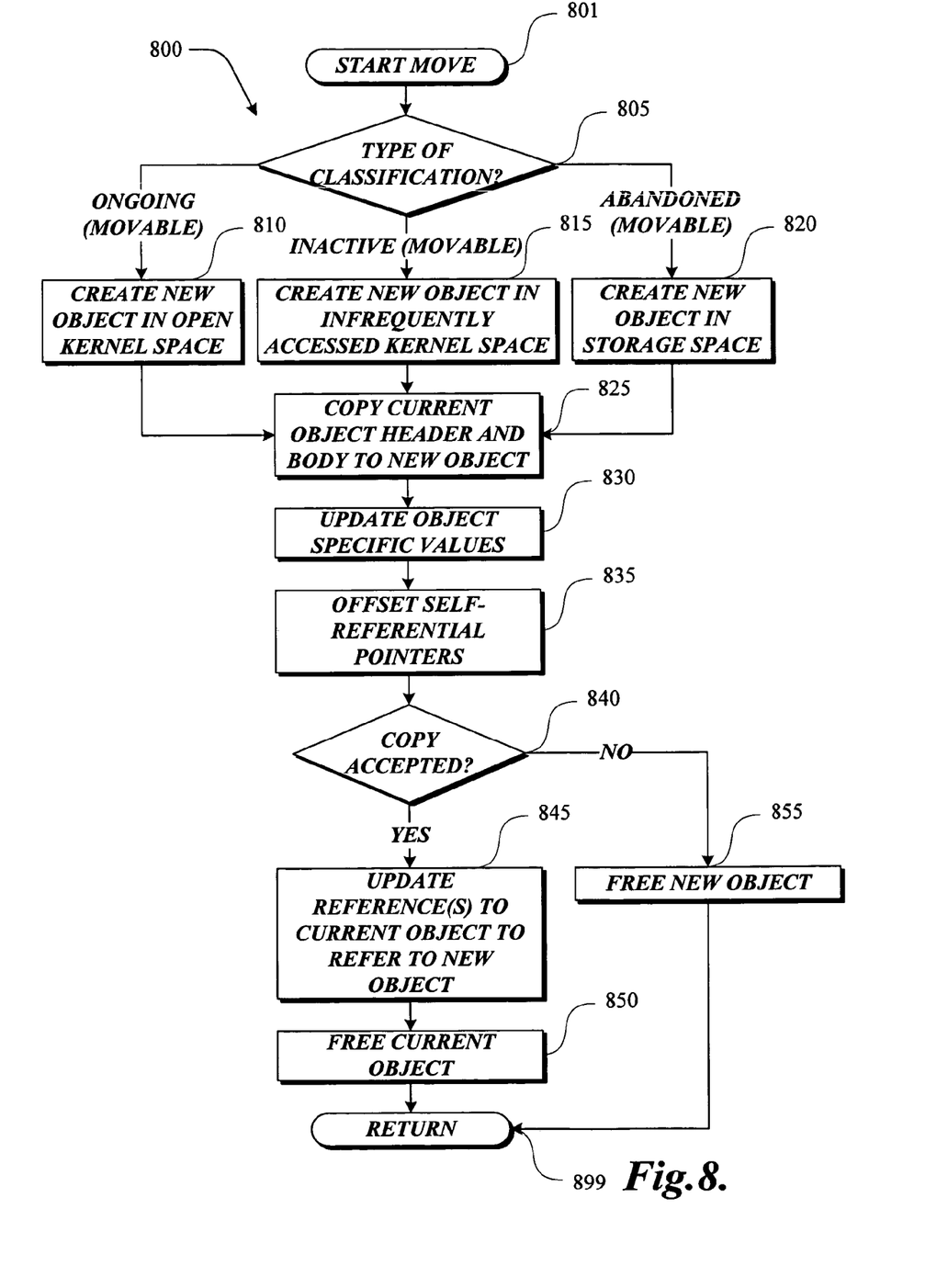
FIG. 8 is a flow diagram illustrating an object moving subroutine suitable for use in FIG. 6.

As noted above, the container processing subroutine 600 (FIG. 6) also includes a move object subroutine 800. As each type of kernel object may have unique fields and specialized data, the move object subroutine 800 of the present invention is an object type specific movement subroutine, i.e., object movement is based on object classification. Further objects that contain references to other objects, or that contain relative offsets from a memory position are handled in a manner designed to avoid destroying the value of any data contained or referred to in the object. An exemplary object moving subroutine 800 is illustrated in FIG. 8 and described next.

Figure 7:
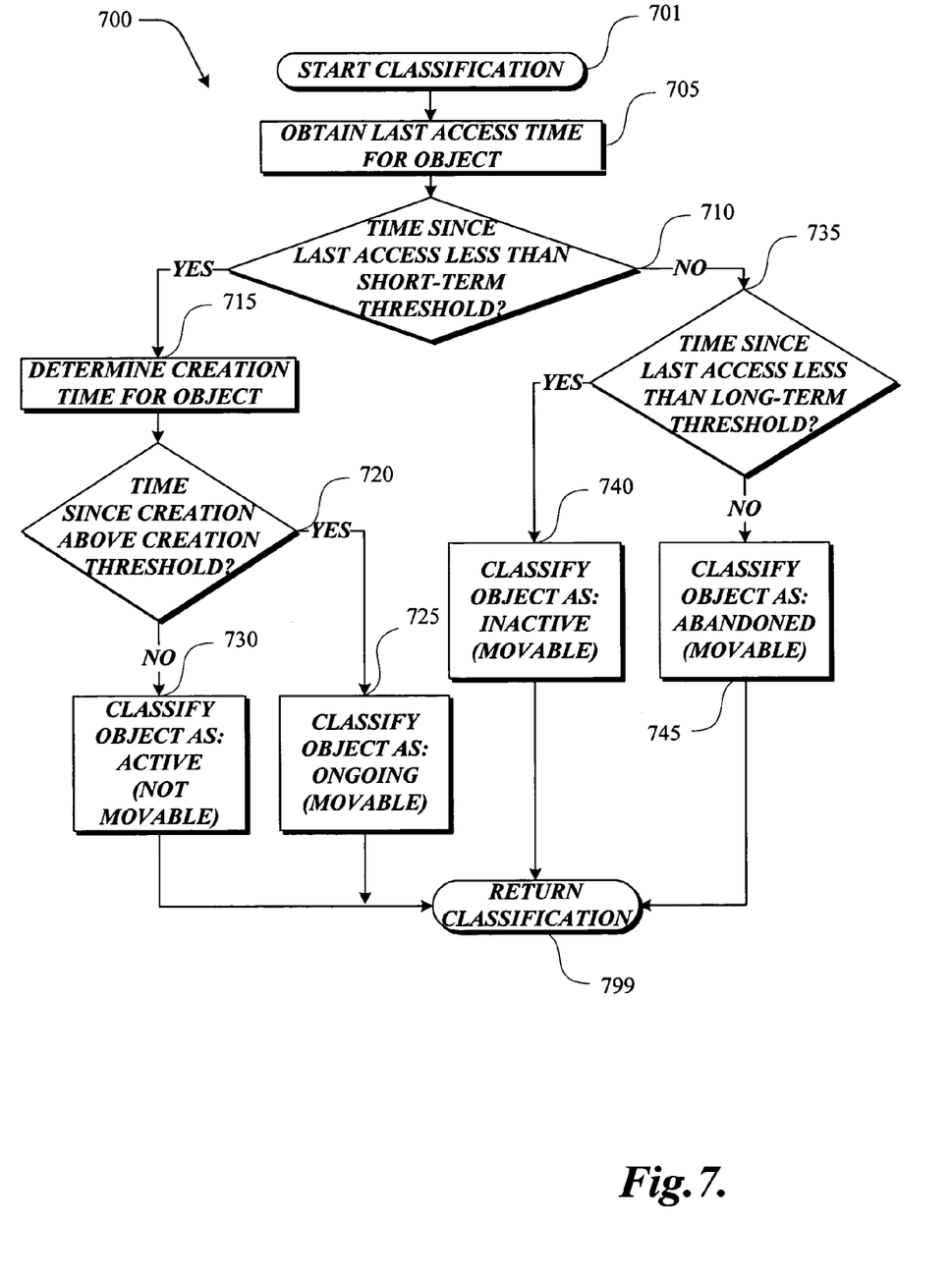
FIG. 7 is a flow diagram illustrating an object classification subroutine suitable for use in FIG. 6.

The object move subroutine 800 begins at block 801 and proceeds to decision block 805 where a determination of the current object classification (e.g., the classification established by subroutine 700 illustrated in FIG. 7) is made. If in decision block 805 it is determined that the current object has been classified as an ongoing (moveable) object, then in block 810 a new object is created in an open region of kernel space, preferably in close proximity to or on the same memory page as other ongoing objects. Moving these long-term allocations from the original memory reduces kernel memory fragmentation. Additionally, the reference locality is improved as these ongoing (movable) objects are placed in the same memory region.

If in decision block 805 it is determined that the current object is classified as inactive (moveable), then a new object is created in infrequently accessed kernel memory space in block 815. Infrequently accessed kernel memory space is memory in the kernel mode that is not accessed as often and is more likely to be paged out of memory due to its infrequent usage. Creating a new object in infrequently accessed kernel memory space removes the object from commonly accessed kernel memory space, while leaving the object in kernel memory space for ready accessibility should the object be requested.

If in decision block 805 it is determined that the current object is classified as abandoned (moveable), there is little or no benefit in maintaining the object in kernel memory space.

Accordingly, in block 820, a new object is created in a storage space location on a memory device such as a persistent storage location (e.g., hard disk or removable memory media), non-addressable memory (e.g., physical memory not mapped into an address space, a flash RAM, etc.), a compressed kernel mode memory location, or even within protected regions of the user-mode memory space of the application containing the handle references to the object.

After a new object has been created in block 810, 815, or 820, processing proceeds to block 825 where the current object header and body are copied to the new object. Then, in block 830, object specific values are updated (e.g., relative offsets are corrected for the new memory location, link pointers are maintained etc.). Also, if an object contains references to additional objects, or memory buffers, the specific routine may move or update those too. Next, in block 835, pointers are offset to correctly point to the new object. In decision block 840, the object-specific move procedure may evaluate whether all object specific references are resolvable or not, and it has the final decision to accept the move or not. If the move is accepted by, in block 845, external references to the current object are updated to refer to the new object (e.g., the pointers to the object from containers).

Next, in block 850 the current object is freed. Freeing is not the same as simply removing a reference count (dereferencing) from the object. Conceptually, a moved object has not disappeared. Rather, it has merely been moved to another location. Dereferencing the moved object would give rise to unwarranted actions by programs (or the operating system) that had referred to the object. Accordingly, merely removing the object from memory without changing the reference count does not trigger any routines activated by a dereferencing of the object. After the current object has been freed, routine 800 returns to its calling routine at block 899.

If in decision block 840 it was determined that the copy is not allowed, processing proceeds to block 855 where the new object is freed. When this path is followed, no change to the current object is made. After the new object is freed, processing proceeds to block 899 and returns to the calling routine.

Later, when a process or the kernel needs to access an object moved outside the kernel memory space, or moved in kernel memory in a form that is not directly accessible (e.g. as a compressed object), the object manager calls a restoration subroutine to restore the object in kernel memory space and updates all references to the new object. The restoration subroutine is similar to (or a variation of) the subroutine presented in FIG. 8. One difference is that there is no classification decision because the restoration location is only to kernel memory space. The object-specific restoration routine will also be responsible to update the object-specific fields according to the new location. One example when this is used is when a container includes a movable object. However, objects that have no specific actions required when they are closed may allow the object manager to take a shortcut and delete the object from the storage without restoring the object to the kernel memory space.

As will be appreciated by those of ordinary skill in the art from the above description, another use of this invention would be to manage kernel mode objects in use by programs that suspend execution for an extended period of time. Programs execution suspension normally occurs when a program is stopped but not terminated. The method of kernel mode object management described above can also be used to "freeze-dry" applications into a persistent storage medium, such as the file system. Freeze-dried applications can be restarted later, even after a reboot of the operating system or after moving the persistent data to another computer system running a compatible version of the operating system—and then adding memory back to the application.

One of the benefits of using the abandoned kernel object detection method of the present invention is that abandoned kernel objects are moved out of kernel mode memory space (except in the case of compressed kernel memory) and into a storage space location. Information gleaned by examining the contents of abandoned kernel objects in a storage location can then be used to assist in correcting any programs or processes that are abandoning objects.

Figure 9:
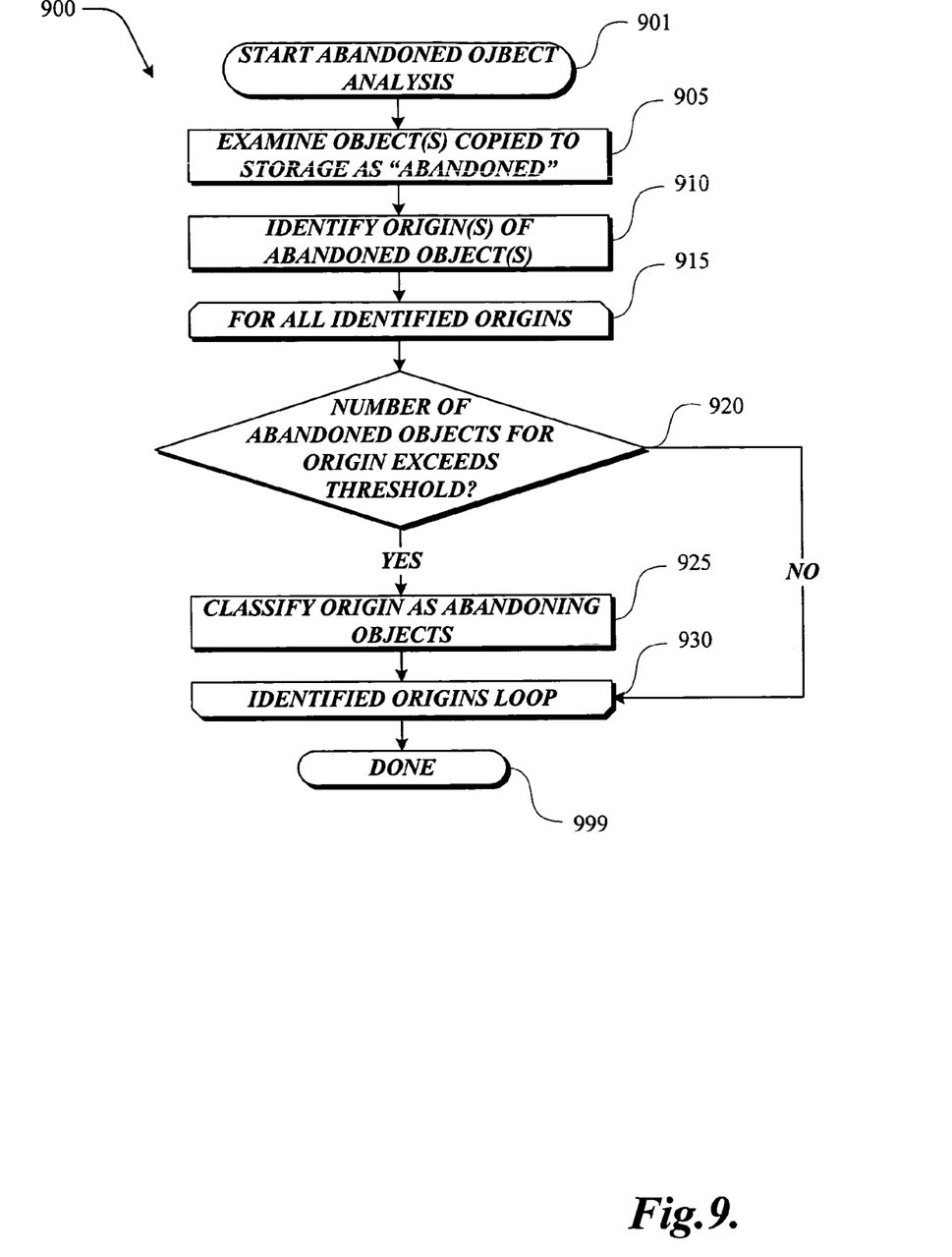
FIG. 9 is a flow diagram illustrating an abandoned object detection routine for detecting abandoned kernel objects formed in accordance with the present invention.

FIG. 9 illustrates an exemplary abandoned object detection routine 900 formed in accordance with the present invention. Abandoned object detection routine 900 begins at block 901 and proceeds to block 905 where the objects that have been copied to storage as abandoned object detection kernel objects are examined. Next, in block 910 the origins (processes, programs, applications, etc.) are identified for each of the abandoned object detection objects. This identification may be accomplished by saving to the storage, at the same time with the object, the owning process (in case this cannot be retrieved from the object otherwise). Next, in looping block 915, the abandoned object detection routine 900 processes the abandoned objects for all identified origins. Then, in decision block 920 a determination is made whether the number of abandoned objects for a current origin exceeds a threshold value. This threshold may be a fixed threshold, e.g., ten to twenty abandoned objects, or may be a dynamic threshold that varies according to aspects of the current operating system and/or computing device 120, e.g., a value of 100 may be used per gigabyte of virtual memory, or the like. Those of ordinary skill in the art and other will appreciate that the number of abandoned objects for a current origin that would indicate an origin that is actually abandoning objects may vary depending on the nature of the operating system, computing device, processor, available memory, and the like. Accordingly, the threshold for classifying an origin as abandoning kernel objects may vary as well. If the number of abandoned objects exceeds an appropriately set threshold, processing continues to block 925 where the object origin is classified as abandoning kernel objects. Processing then continues to looping block 930.

Alternatively, if the number of abandoned objects determined in decision block 920 did not exceed the appropriately set threshold, processing continues to looping block 930. From looping block 930, the subroutine cycles back to looping block 915 unless all identified origins have been iterated through, in which case processing proceeds to block 999 where the abandoned object detection routine 900 ends.

Once abandoning origins have been identified, it is then possible to use the identifications to improve the performance of computing environments by either repairing any abandoning origins, containing them, or avoiding them. Additionally, the identities of the abandoning origins may be used by other programs, or depicted on a display for a computer user's notification.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A method of optimizing kernel mode memory space by managing kernel objects in a computing environment, the method comprising:
    identifying a referenced kernel object at a first memory location referred to by an object container;
    determining if all references to said kernel object are known;
    classifying said kernel object as a movable object if all references to said kernel object are known and updatable;
    retrievably moving said kernel object to a new memory location; and
    updating all references to said kernel object to lead to said new memory location.

2. The method of claim 1, wherein determining if all references to said kernel object at said first memory location are known comprises obtaining a reference count for said kernel object and determining that all references are known from said reference count and said object container.

3. The method of claim 1, wherein said object container is a process handle table.

4. The method of claim 1, wherein at least one of said references is a pointer.

5. The method of claim 1, wherein at least one of said references is a handle.

6. The method of claim 1, wherein retrievably moving said kernel object comprises copying said kernel object to said new memory location; and updating kernel object data affected by said copying.

7. The method of claim 6, wherein moving said kernel object further comprises freeing the kernel object at said first memory location.

8. The method of claim 7, wherein freeing said kernel object at said first memory location comprises freeing the kernel object without dereferencing said kernel object at said first memory location.

9. The method of claim 1, wherein said kernel object is retrievably moved utilizing an object type specific move routine, and wherein said object type specific move routine determines if said kernel object should be moved.

10. A computer-readable medium containing computer-executable instructions for optimizing kernel mode space by managing kernel objects in a computing environment by:
    identifying a referenced kernel object at a first memory location referred to by an object container;
    determining that all references to said kernel object are known;
    classifying said kernel object as a movable object;
    retrievably moving said kernel object to a new memory location; and
    updating all references to said kernel object to lead to said kernel object at said new memory location.

11. The computer-readable medium of claim 10, wherein determining that all references to said kernel object at said first memory location are known comprises obtaining a reference count for said kernel object and determining that all references are known from said reference count and said object container.

12. The computer-readable medium of claim 10, wherein moving said kernel object comprises copying said kernel object to said new memory location; and updating kernel object data affected by a changed location.

13. The computer readable-medium of claim 12, wherein moving said kernel object further comprises freeing the kernel object at said first memory location.

14. A computer-readable medium containing computer executable instructions for managing kernel mode memory by relocating kernel objects to new locations by:
    classifying said kernel objects according to their usage;
    determining a destination memory location type from a kernel object's usage;
    invoking an object type specific move procedure for said kernel object, wherein said move procedure relocates said kernel object to a new memory location in accordance with said determined destination memory location type.

15. The computer-readable medium of claim 14, wherein invoking an object specific move procedure comprises copying said kernel object to said new memory location; updating kernel object data affected by a changed location; and changing any known references to said kernel object to refer to said new memory location.

16. The computer readable medium of claim 15, further comprising computer executable instructions for approving said copying, updating, and changing steps before freeing said kernel object.

17. A computer-readable medium containing computer-executable instructions for detecting abandoned kernel objects in a computing environment by:
    monitoring a kernel memory for a kernel object having a last access time beyond a predetermined threshold;
    retrievably relocating said kernel object to a new location;
    examining said relocated kernel object for an abandoning origin; and
    presenting said abandoning origin.

* * * * *